C. GARDNER.
Ridge-Plow.
No. { 706, 31,710. }   Patented Mar. 19. 1861.
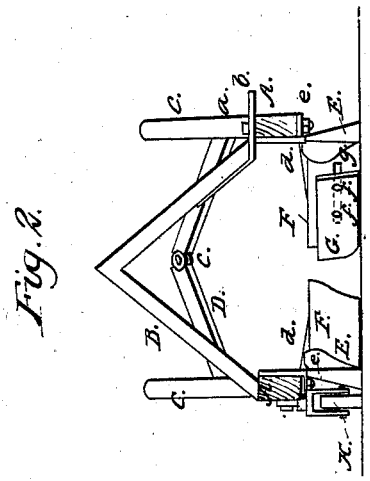
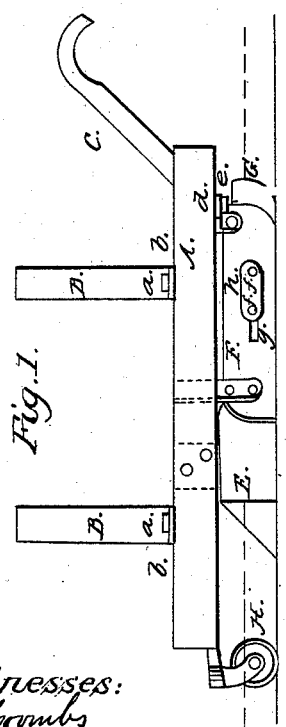
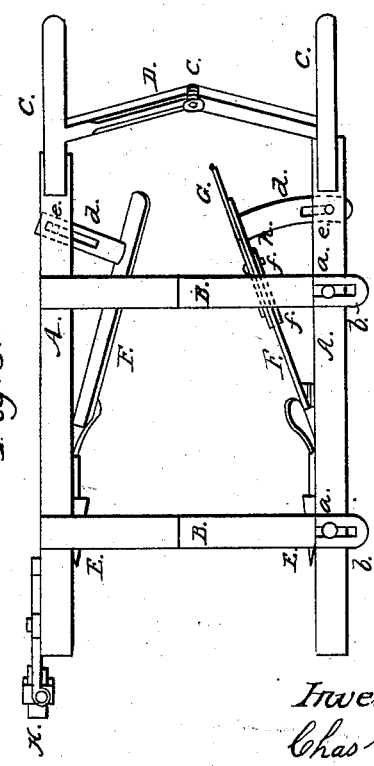

UNITED STATES PATENT OFFICE.

CHARLES GARDNER, OF HOOSICK, NEW YORK.

IMPROVEMENT IN CULTIVATORS.

Specification forming part of Letters Patent No. 31,710, dated March 19, 1861.

*To all whom it may concern:*

Be it known that I, CHARLES GARDNER, of Hoosick, in the county of Rensselaer and State of New York, have invented a new and Improved Implement for Hilling Corn and other Crops which are Grown in Hills or Drills; and I do hereby declare that the following is a full, clear, and exact description of the same, reference being had to the annexed drawings, making a part of this specification, in which—

Figure 1 is a side view of my invention; Fig. 2, a plan or top view of the same; Fig. 3, a front view of the same.

Similar letters of reference indicate corresponding parts in the several figures.

The object of this invention is to obtain a machine of simple construction which will admit of being adjusted laterally for the purpose of placing its shares at a greater or less distance apart, as may be required, and a machine which will admit of being drawn over the rows of plants without injuring the same.

To enable those skilled in the art to fully understand and construct my invention, I will proceed to describe it.

A A represent two parallel bars, which are connected together by V-shaped cross-pieces B B, the form being clearly shown in Fig. 2. The cross-pieces B are connected to one of the bars A by screws $a$, which pass into said bar through slotted plates $b$, attached to one end of the bars. This mode of connection admits of the bars A A being adjusted at a greater or less distance apart, as may be desired, and, if necessary, the other ends of the cross-pieces may be connected to the other bar A in a similar manner.

To the back part of each bar A a handle, C, is attached, and the two handles C C are connected by a jointed brace or cross-piece, D, the joint $c$ being at the center of the cross-piece, as shown clearly in Figs. 2 and 3. This brace or cross-piece, it will be seen, is jointed, in order to admit of the adjustment of the bars A A.

To each bar A a share, E, is attached, and directly back of each share E there is a wing, F, the front ends of which may be connected to the back parts of the shares E, or to pendants attached to the bars. The wings F F, as well as the back parts of the shares E E, have an oblique position relatively with the bars A A, the wings being nearer each other at their back than at their front ends, as shown clearly in Fig. 3. The back parts of the wings are connected to the bars A A by slotted arms $d$ $d$, through which screws $e$ pass into the bars. This arrangement will admit of the wings F being adjusted in a more or less oblique position, provided the front ends of the wings have a jointed or elastic attachment to the bars A or shares E. The adjustment of the wings F would be desirable; but still the machine would be valuable without such an adjustment. Each wing F is provided with an extension-plate, G. These plates are attached to the wings by bolts $f$, which pass through oblong slots $g$ in the wings, and have small plates $h$ secured to their outer ends. The plates G have their lower edges on a level with the lower edges of the wings F, and when drawn out of course they virtually increase the length of the wings.

The draft-animal is attached to one of the bars A of the implement, and a caster-wheel, H, is attached to the front end of the other. The animal walks between the rows of plants, while the machine is drawn along over or on the rows, a bar, A, and a share, E, with its wing, being at each side of the plants, and the V-shaped cross-pieces B, being placed in vertical planes, pass over the top of the plants without injuring them in the least. By adjusting the plates G the earth may be thrown as close to the plants as desired, and by adjusting the bars A A the shares E may be placed nearer together or farther apart, as may be required. In fact, the adjustment of the bars A and plates G admits of the earth being thrown up to the plants just as circumstances may require.

I am aware that curved elevated cross-pieces have been used to connect the sides or parallel bars of cultivators; but they are expensive to construct if made of wood, and if made of metal they spring or give, so as to render the machine rather inefficient; but by having the cross-pieces made of V shape, as shown, very economical and stiff or rigid elevated cross-pieces are obtained.

Having thus described my invention, what I claim as new, and desire to secure by Letters Patent, is—

The parallel bars A A, jointed handle-brace D, wings F, provided with sliding or extension plates G, and the V-shaped cross-pieces B B, all combined and arranged for joint operation, as and for the purpose set forth.

CHARLES GARDNER.

Witnesses:
  I. P. ARMSTRONG,
  GEORGE WILCOX.